(12) United States Patent
Mueller

(10) Patent No.: US 6,273,367 B1
(45) Date of Patent: Aug. 14, 2001

(54) COVER-SKIN STRUCTURE

(75) Inventor: Dietmar Mueller, Reinheim (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/465,775

(22) Filed: Dec. 17, 1999

(30) Foreign Application Priority Data

Dec. 17, 1998 (DE) .............................................. 198 58 435

(51) Int. Cl.[7] .................. B64C 1/00; B64C 3/00; B64C 5/00; B64C 30/00
(52) U.S. Cl. ........................ 244/123; 244/117 R
(58) Field of Search .................... 244/123, 119, 244/117 R, 133; 428/77, 98, 112, 221

(56) References Cited

U.S. PATENT DOCUMENTS

| | | | |
|---|---|---|---|
| 3,109,613 | * | 11/1963 | Bryant et al. ............................ 244/44 |
| 3,774,864 | * | 11/1973 | Hurkamp ................................ 244/13 |
| 3,780,969 | * | 12/1973 | Nussbaum et al. .................... 244/123 |
| 3,827,661 | * | 8/1974 | Ryan et al. ............................ 244/123 |
| 4,310,132 | * | 1/1982 | Robinson et al. ..................... 244/119 |
| 4,565,595 | * | 1/1986 | Whitener ............................... 156/156 |
| 4,671,471 | * | 6/1987 | Patmont ................................. 244/123 |
| 6,060,523 | * | 4/2000 | Kraenzien ............................. 244/123 |

FOREIGN PATENT DOCUMENTS 196 43 222    4/1998  (DE) .

* cited by examiner

Primary Examiner—Charles T. Jordan
Assistant Examiner—Christian M. Best
(74) Attorney, Agent, or Firm—Crowell & Moring, L.L.P.

(57) ABSTRACT

A cover-skin web structure for use in flow profiles, in particular aerofoils or their components, comprising a cover skin on the pressure side and a cover skin on the suction side, connected by webs essentially comprising fiber reinforced material. The webs are aligned in the direction of the span and essentially have one or several web cutouts which extend from the cover skin on the suction side to the cover skin on the pressure side. The webs are made of metal in the area of the web cutouts.

8 Claims, 1 Drawing Sheet

COVER-SKIN STRUCTURE

BACKGROUND OF THE INVENTION

This application claims priority of DE 198 58 435.0, filed Dec. 17, 1998, the disclosure of which is expressly incorporated by reference herein.

The present invention relates to a cover-skin web structure for use in flow profiles, in particular aerofoils or their components, comprising a cover skin on the pressure side and a cover skin on the suction side, connected by webs aligned in the direction of the span. The webs have one or several web cutouts essentially extending from the cover skin on the suction side to the cover skin on the pressure side.

In many cases, modern wing profiles are of modular design so as to ensure good and fast access to the individual areas of the structure. Thus structures are used whose cover skins on the suction side or on the pressure side are connected via webs aligned in the direction of the span. The cover-skin web structure is pushed over the ribs attached to the structural parts, with the ribs being aligned in the airflow direction.

DE 196 432 22 A1 shows a known cover-skin web structure made of fiber reinforced material for the landing flap of an aerofoil. A cover skin on the suction side and on the pressure side is connected by webs aligned in the span direction. The webs comprise web cutouts, offset in the direction of the span. Ribs aligned in the direction of airflow and attached to structural parts engage the web cutouts so as to ensure stabilization of the structure under aerodynamic loads in the airflow direction. This structure is constructed in a modular way, is of lightweight construction due to its production from fiber reinforced material and can be bent with little force if a profile change is desired.

This structure has the disadvantage that the fiber reinforced material of the webs, in the area of the web cutouts, does not stand up to the high aerodynamic loads which are introduced via the webs into the ribs. Considerable material extension can be achieved with fiber reinforced materials if the material is exposed to the loads along the direction of the fibers. Because such a fiber geometry cannot be realized in the fringe area of the web cutouts to the ribs, however, the achievable elongation is insufficient to transfer the aerodynamic loads in the fringe area from the webs to the ribs without damaging the fiber reinforced material.

SUMMARY OF THE INVENTION

An object of the present invention is to improve a cover-skin web structure to the extent that, while being of lightweight construction, it is sufficiently stable to introduce the high aerodynamic loads from the cover skins via the webs into the ribs without exceeding the extension limits of the material in the transitional area from the webs to the ribs. This structure should also be economical to produce.

To meet this object, a cover-skin web structure is provided such that the webs are made in the area of the web cutouts.

In the cover-skin web structure according to the invention, in the area of the web cutouts, more extensive material extensions are possible without the webs being damaged because, as a result of the use of metallic materials, their isotropic properties are made use of. Thereby no special layer design of a fiber reinforced construction needs to be taken into consideration. In this way the design is simplified and production is more economical.

In a currently preferred embodiment, the cover-skin web structure is flexible so that in the area of the aerofoil where the cover-skin web structure is fitted, a change in curvature, i.e. a change in the aerofoil profile, can be carried out without any kinking. By changing the curvature of flexible structures, the operative range of the wing can be matched to the particular flight condition at the time, leading to increased operational flexibility.

In this context it is particularly advantageous to use adjustment devices which instead of the ribs extend through the web cutouts into the cover-skin web structure thus bringing about a change in curvature of the structure. As a result of adjustment devices whose forces act in the interior of the structure, the aerodynamics of the profile are maintained, in contrast to the situation with actuating devices attached to the aerofoil. These latter structures require an aerodynamic fairing which results in an unfavorable airflow on the aerofoil.

To be sure, the structure results in considerable thrust loads and tensile loads acting on the webs because, as a result of the unfavorable lever ratio between the adjustment device and the cover-skin web structure both during transmission of the aerodynamic loads and during curvature of the structure, considerable forces have to be transmitted. With additional curvature of the cover-skin web structure, in addition to the aerodynamic loads, there are also restoring forces of the elastic structure, resulting in the materials being exposed to additional loads.

With such high loads on the webs it is necessary to adapt these webs to the maximum extension occurring, by using metal in the area of the web cutouts. This also applies to embodiments where the adjustment devices interact with the web cutouts, and devices where the ribs extend through the web cutouts, if a constant curvature of the structure is maintained and only the aerodynamic loads are transferred. The suction or pressure forces at the respective cover skins need to be transferred to the ribs or adjustment devices via the webs. During such transfer, the webs are essentially stressed along their lengths.

When using metallic cover skins, welding of the cover skins with the metallic areas of the webs is possible. Likewise, irrespective of the cover-skin material, the cover skins can be bonded to the metallic areas of the webs but for optimal load transfer between the cover skins and the webs it is advantageous if the cover skins are riveted to the metallic areas of the webs. This offers the best way for absorbing any shearing forces that may occur between the components so that the cover skins do not detach from the webs in the highly stressed metallic areas.

Preferably, the metallic areas of the webs are made from titanium. Titanium has a very high maximum elongation limit so that the webs withstand the high loads in the area of the web cutouts at the contact surfaces to the ribs or adjustment devices. In addition, titanium is highly flexible and, in the case of a change in curvature, allows slight bending of the webs without material fractures occurring.

The cover skins of the cover-skin web structure can be made from a metal or an alloy but the use of cover skins comprising fiber reinforced material is particularly favorable because the weight of the entire structure is kept extremely low. In addition, where adjustment devices are used and thus the structure is subject to curvature, this provides high flexibility of the cover skins combined with high strength because in this case the fibers in the cover skins can be aligned in such a way that loads occur along the direction of the fibers. In this way, high resistance to extension of the cover skins is achieved.

Because the load exposure of the webs outside the areas with the web cutouts is reduced, the webs in these sections essentially comprise fiber reinforced material. Thereby, a further weight reduction of the cover-skin web structure is realized. When using cover skins made of fiber-reinforced material, the web sections can be made of fiber-reinforced material and the cover skins at the same time, and insert the metallic web areas separately.

The web sections made of fiber reinforced material and the metallic areas of the webs are preferably arranged so as to be offset in respect of each other in the direction of airflow. While this leads to an interruption of the entire web in the direction of the span, there are no contact problems in the transition area between metal and fiber reinforced material, which may result in corrosion in the metal area. The course of the webs in the direction of the span is interrupted only insignificantly if the web areas are only arranged so as to be offset by the width of the web and if this is subsequently corrected towards or away from the direction of airflow. In addition, such an embodiment offers advantages for production because the mutual tolerances when arranging the metallic areas and the web sections can be increased.

Preferably, stringers are arranged between the webs. The stringers are aligned in the direction of the span, parallel to the webs and are attached either to the cover skin on the suction side or to the cover skin on the pressure side. They extend from the cover skins to an area in the structure which is situated between the cover skins. Since the stringers on the suction side and on the pressure side do not touch each other, they can be attached to the two cover skins at the respective positions in the direction of airflow, or they can be partially offset. In order to be able to further allow ribs or adjustment devices to interact with the cover-skin web structure through the web cutouts, the stringers are interrupted in the region of the web cutouts. Both in the case of a rigid and in the case of a bendable structure, such an embodiment results in a changed flow of forces which relieves the web cutouts.

BRIEF DESCRIPTION OF THE DRAWINGS

The sole FIGURE is a perspective partial view of a section of the cover-skin web structure in accordance with the present invention.

DETAILED DESCRIPTION OF THE DRAWING

Figure 1:
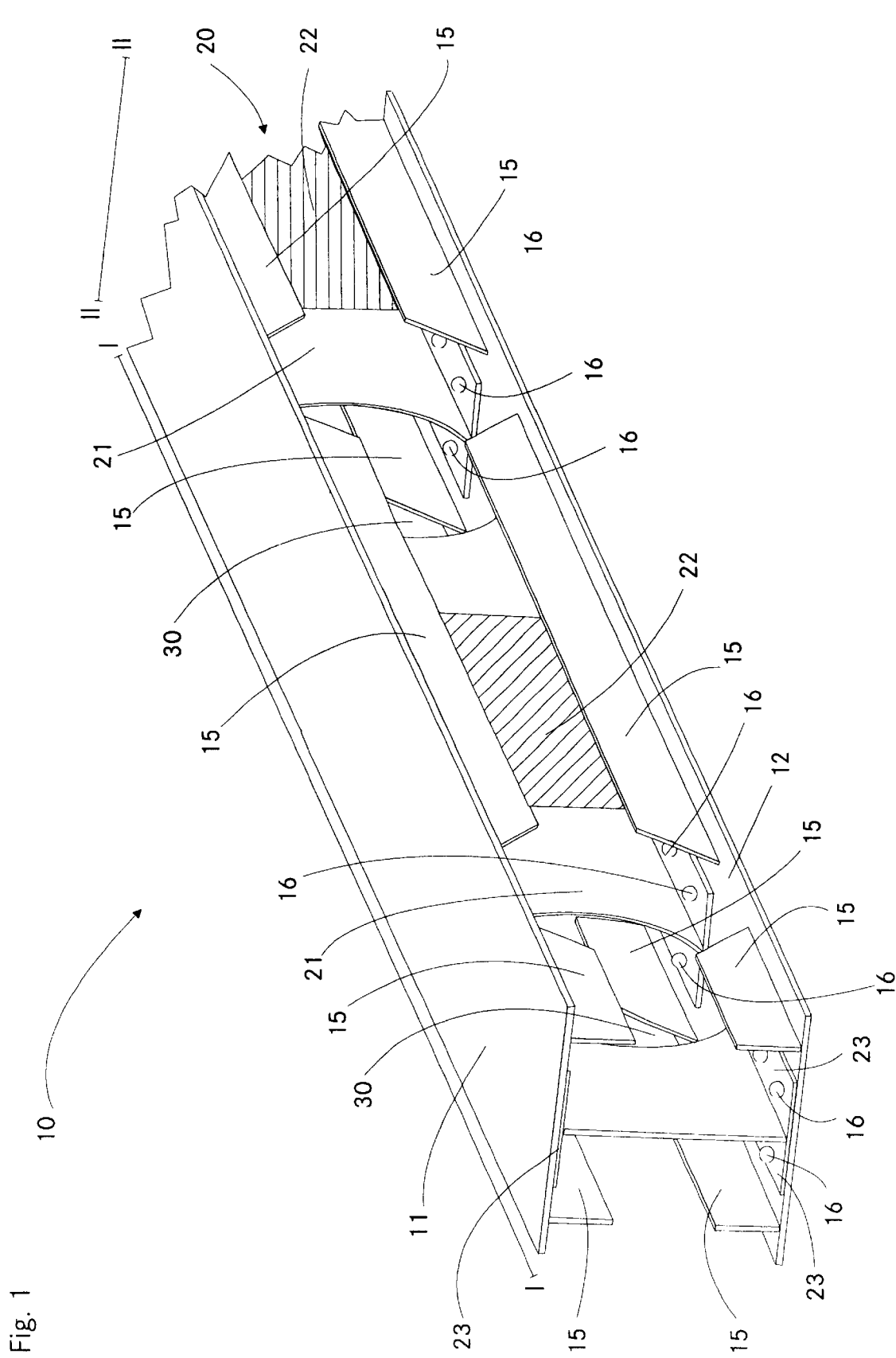

The sole FIGURE shows a section of the cover-skin web structure 10, inserted into an aerofoil, delimited by a cover skin 11 on the suction side and a cover skin 12 on the pressure side, both made of fiber reinforced material. The cover skins 11, 12 are connected by several webs 20 arranged offset to each other in the direction of airflow II—II. (For the sake of clarity only one of the webs 20 is shown).

The webs 20 extend along the direction of the span I—I and are shaped like a double T-support. They comprise alternately metallic areas 21 made of titanium and web sections 22 made of fiber reinforced material. The metallic areas 21 comprise web cutouts 30 extending from the cover skin 11 on the suction side to the cover skin 12 on the pressure side. The cutouts 30 are essentially round in shape.

During operation, conventional adjustment devices (not shown) are led through the web cutouts 30. The adjustment devices prevent unintended bending of the structure in the direction of the airflow due to aerodynamic loads and the introduction of forces into the structural sections of the aerofoil. At the same time they cause curvature of the structure to adjust the profile to the actual flight conditions.

The cover surfaces 23 of the metallic areas 21 of the webs 20 are connected to the insides of the cover skin 12 on the pressure side and the cover skin 11 on the suction side by rivets 16 or the like. In the web sections 22 made of fiber reinforced material, the webs 20 are bonded to the cover skins 11, 12.

Parallel to the webs, stringers 15 made of fiber reinforced material extend in the direction of the span and are integrally produced with the cover skins 11, 12. However, an embodiment is possible where the stringers 15 are connected to the cover skins 11, 12 by a bonding or riveting strip.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cover-skin web structure for use in a flow profile, comprising a cover skin on a pressure side of the flow profile and a cover skin on a suction side of the flow profile, and webs connecting the cover skins comprising essentially fiber-reinforced material, said webs being aligned in a direction of span of the flow profile and having at least one web cutout extending from the cover skin on the suction side to the cover skin on the pressure side, and the webs being metal in an area contiguous with the web cutouts.

2. The cover-skin web structure according to claim 1, wherein the cover-skin web structure is flexible.

3. The cover-skin web structure according to claim 2, wherein the cover-skin web structure is arranged to have adjustment devices for curving thereof extending through the web cutouts.

4. The cover-skin web structure according claim 1, wherein the cover skins are riveted to metallic areas of the webs.

5. The cover-skin web structure according to claim 1, wherein the metallic web areas comprise titanium.

6. The cover-skin web structure according to claim 1, wherein the cover skins comprise fiber-reinforced material.

7. The cover-skin web structure according to claim 1, wherein metallic areas and sections comprised of fiber-reinforced material are arranged offset with respect to each other in a direction of airflow.

8. The cover-skin web structure according to claim 1, wherein stringers aligned in the span direction, are arranged between the webs and extend from at least one of the cover skin on the suction side and the cover skin on the pressure side to an area between the cover skins, said stringers being discontinuous in an area of the web cutouts.

* * * * *